United States Patent [19]

Kennedy

[11] 3,749,225
[45] July 31, 1973

[54] CHANNELIZER APPARATUS

[75] Inventor: William S. Kennedy, San Jose, Calif.

[73] Assignee: Acurex Corporation, Mountain View, Calif.

[22] Filed: Nov. 11, 1971

[21] Appl. No.: 197,657

[52] U.S. Cl.......................................... 198/31 AA
[51] Int. Cl............................................. B65g 47/26
[58] Field of Search.................. 198/31 AA, 31 AB; 209/121

[56] References Cited
UNITED STATES PATENTS

| | | | |
|---|---|---|---|
| 3,093,245 | 6/1963 | Worcester | 198/31 AB |
| 3,009,572 | 11/1961 | Seaborn | 198/31 AB |
| 3,511,357 | 5/1970 | Vanderhoof | 198/31 AB |

*Primary Examiner*—Edward A. Sroka
*Attorney*—Flehr, Hohbach, Test, Albritton & Herbert

[57] ABSTRACT

Channelizer apparatus for channeling products to various positions including an endless conveyor supporting a plurality of product carriers which move with the conveyor and which can move from side to side on the conveyor with a plurality of guide means mounted under the conveyor for guiding said carriers along predetermined paths as the conveyor moves forward and means for positioning each of said carriers to cooperate with a selected one of said guide means as it moves forward at the input of the conveyor to deliver product to a particular location at the output end of the conveyor.

9 Claims, 10 Drawing Figures

WILLIAM S. KENNEDY
INVENTOR.

BY Flehr, Hohbach, Test,
Albritton & Herbert
ATTORNEYS

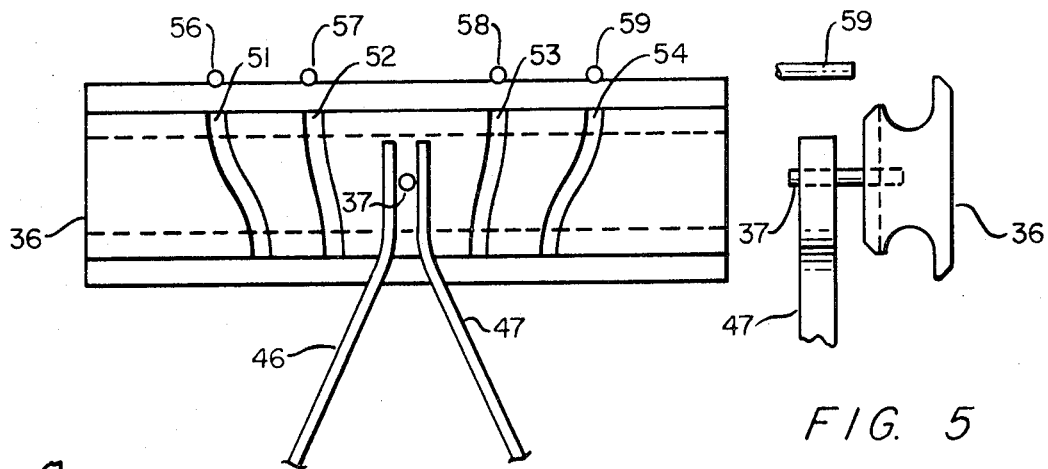
FIG. 4
FIG. 5
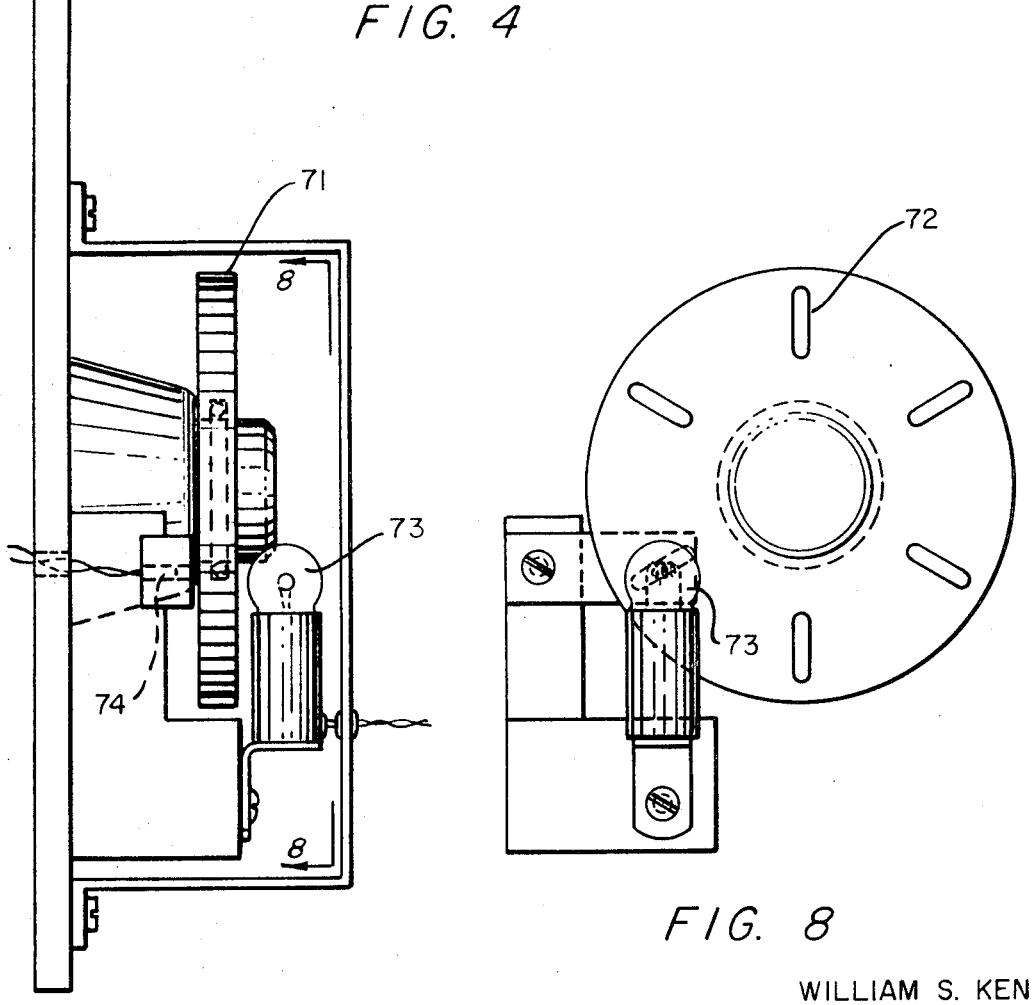
FIG. 7
FIG. 8
WILLIAM S. KENNEDY
INVENTOR
BY Flehr, Hohbach, Test, Albritton and Herbert
ATTORNEYS

CHANNELIZER APPARATUS

BACKGROUND OF THE INVENTION

This invention relates to a channelizer apparatus and more particularly to an apparatus wherein product delivered to one end of a conveyor is delivered to a selected one of a plurality of locations at the output end of the conveyor responsive to input command signals.

Channerlizer systems employing endless conveyors supporting a plurality of product carriers which move with the conveyor and which can move from side to side with respect to the conveyor and which include guiding means for guiding the carriers along predetermined paths as the conveyor moves forward and including means for positioning the carriers to cooperate with a selected guide are known in the prior art. Although the systems of the prior art were a vast improvement over segregation, rejection or channelizing systems then in existence, they are capable of operation only at moderately high speeds without malfunction because of the complexity of the carrier diverter and positioning mechanism for positioning the carriers with respect to the guides at the input end of the conveyor.

OBJECTS AND SUMMARY OF THE INVENTION

It is a general object of the present invention to provide an improved product channelizer apparatus which is simple in construction and capable of high speed operation.

It is another object of the present invention to provide an improved product channelizing apparatus which includes an electromagnetic means and cams for diverting and positioning the carriers for cooperation with the guides at the input end.

The channelizer apparatus of the present invention includes an endless conveyor having an input and output end with a plurality of product carriers mounted to move with the conveyor and from side to side on the conveyor. The carriers include a projection on one face which cooperates with at least one guide mounted under said conveyor between the input and output ends to engage the projection and move the carrier laterally as the conveyor moves the carriers forward from the input to the output end whereby carriers follow a predetermined path between the input and output ends of the conveyor. Return guide means engage the projection as the carriers return from the output towards the input end and move the carriers whereby they are delivered to a predetermined position adjacent the input end. At least one curved cam is carried on the face of each of the carriers and at least one cam follower is mounted along the path of travel of said carriers near the input end adjacent the return guide means and means are provided for selectively moving said cam follower into said groove after the carriers leave the return guide whereby said carriers move laterally from said predetermined location to a selected position where they engage a selected guide which guides the carriers over said predetermined path.

BRIEF DESCRIPTION OF THE DRAWINGS

FIG. 4 is an enlarged view of a carrier showing a cam and cam followers.

FIG. 5 is a side elevational view of the parts shown in FIG. 4.

FIGS. 7 and 8 show photoelectric means for providing carrier location signals.

DESCRIPTION OF THE PREFERRED EMBODIMENT

Figure 1:
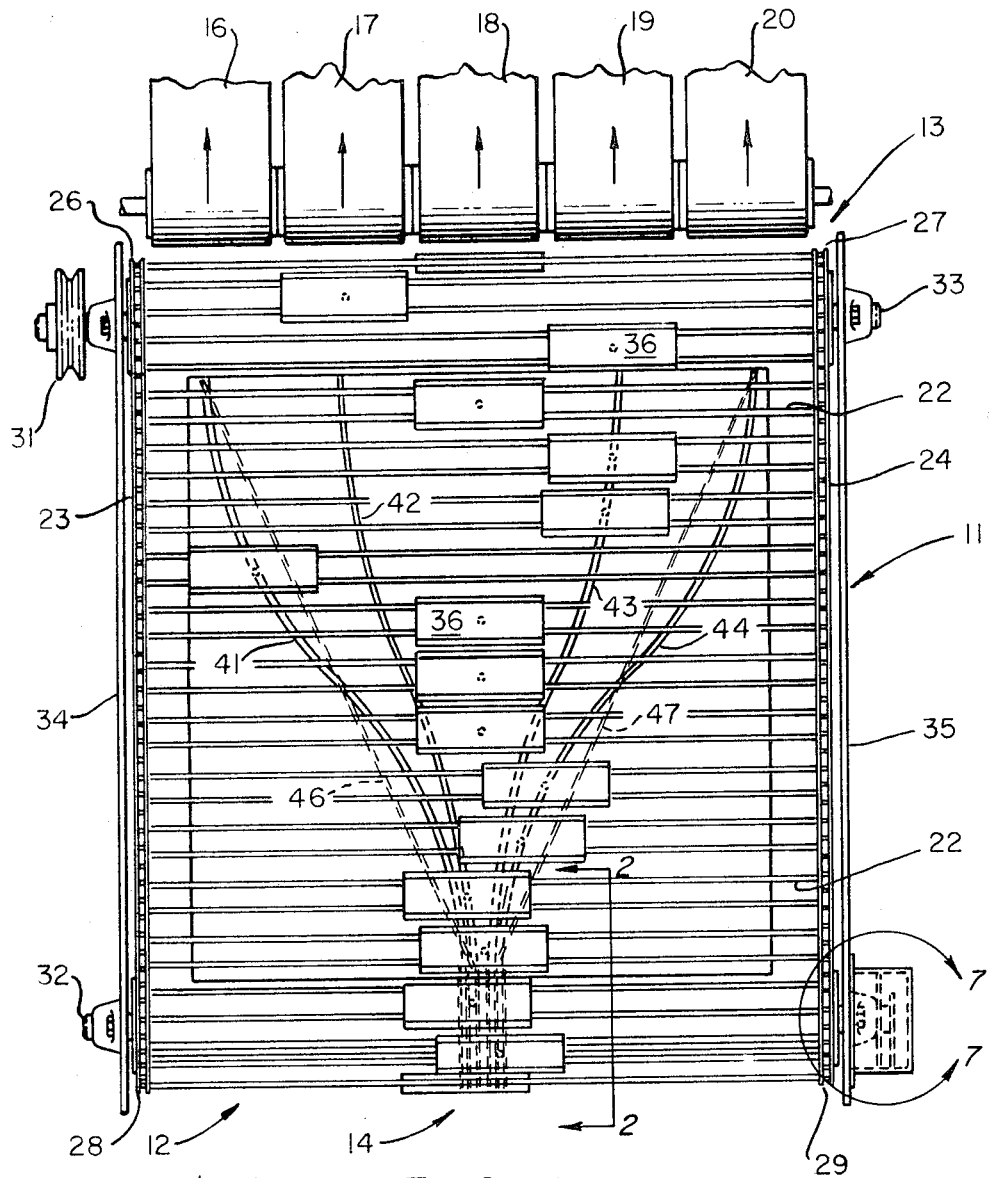
FIG. 1 is a plan view of the apparatus in accordance with the invention.

The channelizer apparatus, FIG. 1, includes an endless conveyor designated 11 having an input end 12 and an output end 13. Product is delivered at a predetermined input location 14 at the input end 12 and the product is channelized and delivered to a plurality of output locations such as to five associated conveyor belt locations 16, 17, 18, 19 and 20.

The conveyor includes a plurality of parallel rods 22 which are supported by spaced endless chains 23 and 24. The chains are driven by drive sprockets 26 and 27 and extend over idler sprockets 28 and 29. The drive sprockets are suitably driven as, for example, by a motor which drives a pulley 31. The shafts 32 and 33 which support the drive and idler sprockets, respectively, are suitably journalled on spaced plates 34 and 35.

Figure 2:
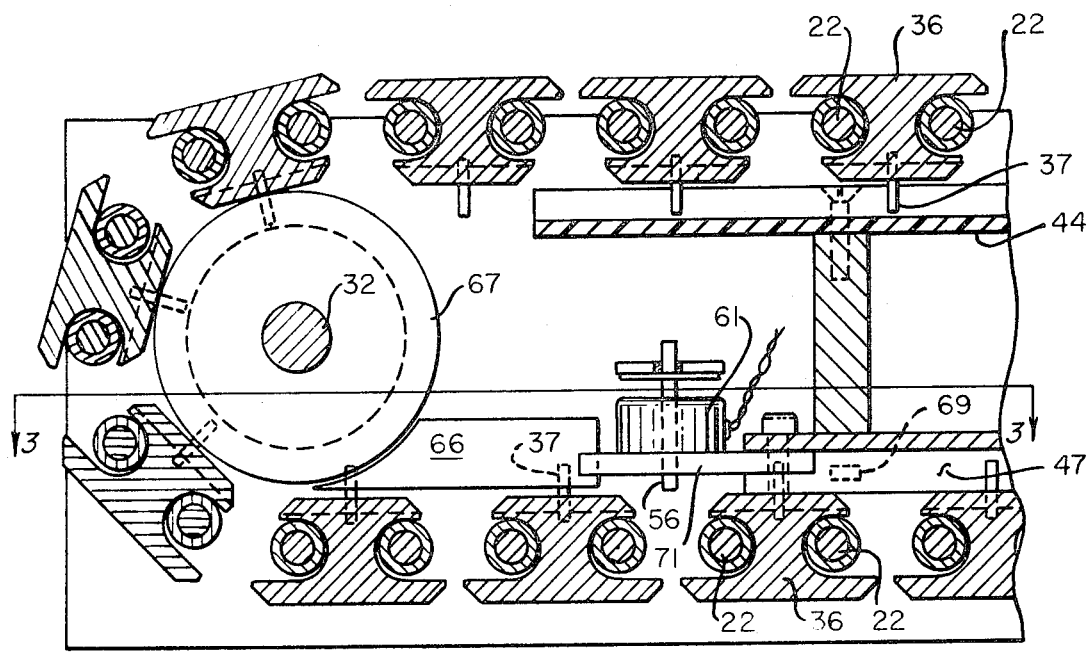
FIG. 2 is a sectional view taken along the line 2—2 of FIG. 1.
Figure 3:
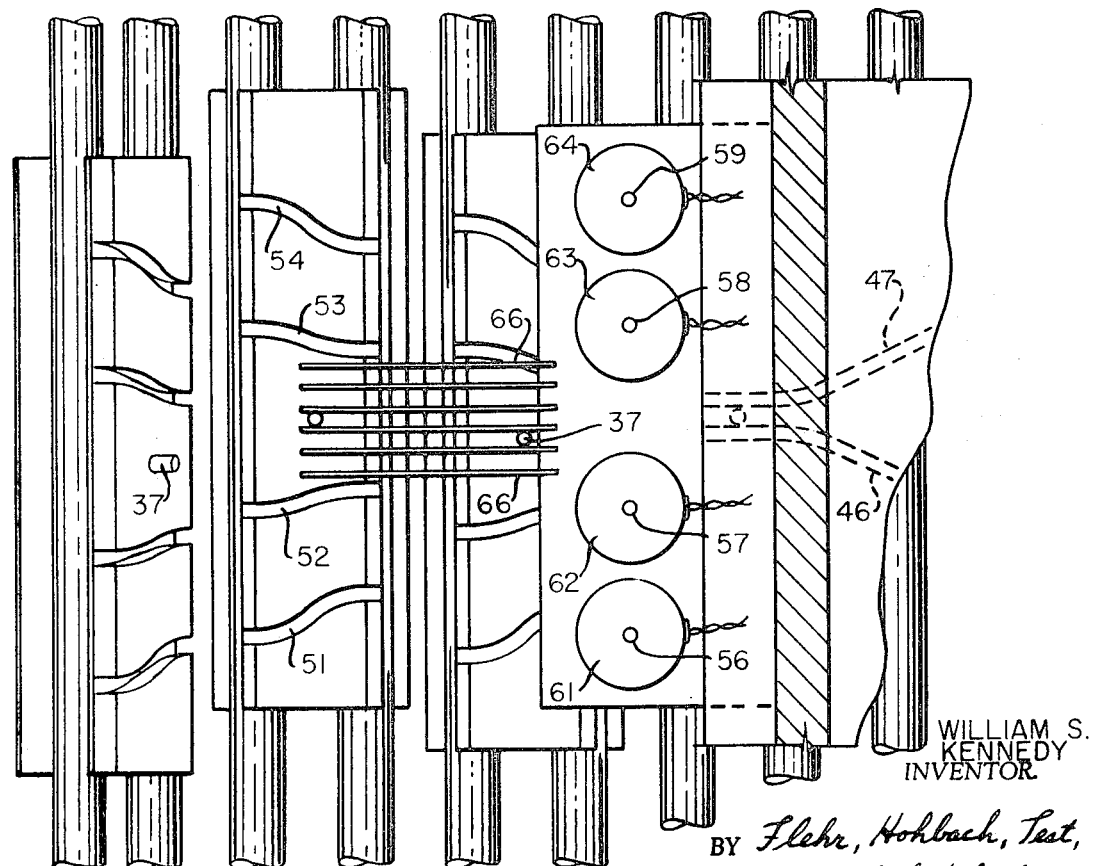
FIG. 3 is a sectional view taken along the line 3—3 of FIG. 2.

A plurality of carriers 36 are mounted and carried by the rods. The carriers 36 serve as a support for the articles which are channelized. The carriers 36 are more clearly shown in FIG. 2 and are adapted to engage a pair of adjacent spaced rods 22. The carriers move with the rods from the input to the output end and are free to move laterally from one side of the conveyor to the other. Preferably, the carriers 36 are made of plastic material whereby to minimize friction and wear. The carriers, of course, can take other forms as, for example, a block of plastic having two holes adapted to receive a pair of adjacent spaced rods 22 or they may include a loop of plastic which engages the rods. In any event, the carriers are mounted upon the spaced rods to move from the input to the output end and are free to move laterally on the conveyor.

Each of the carriers includes a guide projection means 37 which extends outwardly from one face of the carrier. The guide projection 37 may take the form of a pin. The projection shown is in the form of a guide pin adapted to cooperate with guides 41, 42, 43 and 44 which are mounted beneath the upper reach of the conveyor between the input and output ends. As the carriers travel from the input end, they engage one of the guides. Positioning means, to be presently described, are provided to locate or position the carriers laterally whereby each guide pin engages one of the guides 41, 42, 43 or 44, or none of the guides. By selectively engaging the pin with one of the guides, the carrier will move through a path which is defined by the curvature of the particular guide and reach a predetermined location at the output end. A carrier which is not diverted at the input end travels in a straight line to a central location at the end. Thus, as the carriers move from the input to the output end, they are also moved laterally by the guides to arrive at the appropriate output location whereby product supported on each carrier is delivered to a selected output location.

As the carriers return from the output end of the conveyor towards the input end along the lower reach of the conveyor belt, they are brought to a predetermined location near the input end of the conveyor. The means for accomplishing this positioning comprises a pair of converging return guides 46 and 47, FIGS. 1, 2 and 4, which accurately fix the lateral position of the carrier 36 as it reaches the positioning mechanism.

One face of each carrier is provided with a plurality of cams 51, 52, 53 and 54 in the form of grooves. There is one less cam groove than there are output locations since an undeflected carrier will travel along the center of the conveyor from the input to the output end. One of the cams 51, 52, 53 and 54 can be selectively engaged by cam followers 56, 57, 58 or 59. The cam followers are a part of or are connected to the armature of solenoids 61, 62, 63 and 64, respectively. By selectively energizing one of the solenoids, its cam follower will project into line with and then engage the corresponding groove as the carrier moves forward. By bringing the carriers to a predetermined position during the return path, the carriers will be in position whereby any one of the selected pins will project to be in position to engage the selected cam groove. As the carrier moves forward, the cam follower and cam act to move the carrier laterally and accurately position the carrier to a position corresponding to the selected guide. Carrier location is maintained by guiding the pin until it engages the selected guide. The pin passes between a plurality of spaced guide plates 66 into the space between a plurality of spaced guide discs 67 carried on the idler shaft 32 to the top of the conveyor where the pin engages a selected one of the guides. As previously described, if no solenoid is energized, the pin passes between the guides and travels in a straight path to the end.

It is apparent that the cams may be in the form of rails attached to the face of the carrier or that where a limited number of paths are involved, the cams may comprise a curved end of the carrier. It is also possible to place the cams on the solenoids and the cam followers on the carriers whereby the cams are moved to engage the followers.

Means are provided for assuring that the solenoids can be energized only when there is a space between carriers whereby to project the selected cam follower to engage the cam groove of the next carrier. For this purpose, there may be provided means for detecting the location of the carriers 36. One such means may comprise a magnetic head 69, FIG. 6, which is mounted on the solenoid mounting bracket 71 to sense the guide pin of the preceding carrier and provide an output signal which is used to assure that the solenoids can only be energized at the appropriate time.

FIGS. 7 and 8 shown another means for providing a carrier location signal. The means shown include a disc 71 mounted on the idler shaft and adapted to rotate therewith. The disc is provided with a plurality of openings 72 which are spaced corresponding to the spacing of the carriers. A light source 73 is mounted on one side of the disc and a photodetector 74 is mounted on the opposite side. An output pulse is generated each time a slot 72 passes between the light source and the photocell. By appropriately locating the slot 72, a signal is generated each time the carriers are in proper position for energization of one of the solenoids to move the cam follower into position. Other means may be provided for assuring that the solenoids are energized only during the gap between the carriers.

It is to be observed that any arbitrary number of channels can be accommodated with one design by providing cam grooves sufficient for the largest number of paths desired and by only installing the desired number of cam follower actuation solenoids. For example, in the machine just described, a three-way machine can be provided with only a pair of solenoids. It is further observed that speed of actuation can be relatively high since only low inertial parts are involved in moving the cam follower into the cams. Wear on the cam grooves is spread over a large number of carriers and hence the life is relatively long. The curvature of the cam grooves can be made such as to minimize lateral forces and to reduce side impacts.

Figure 9:
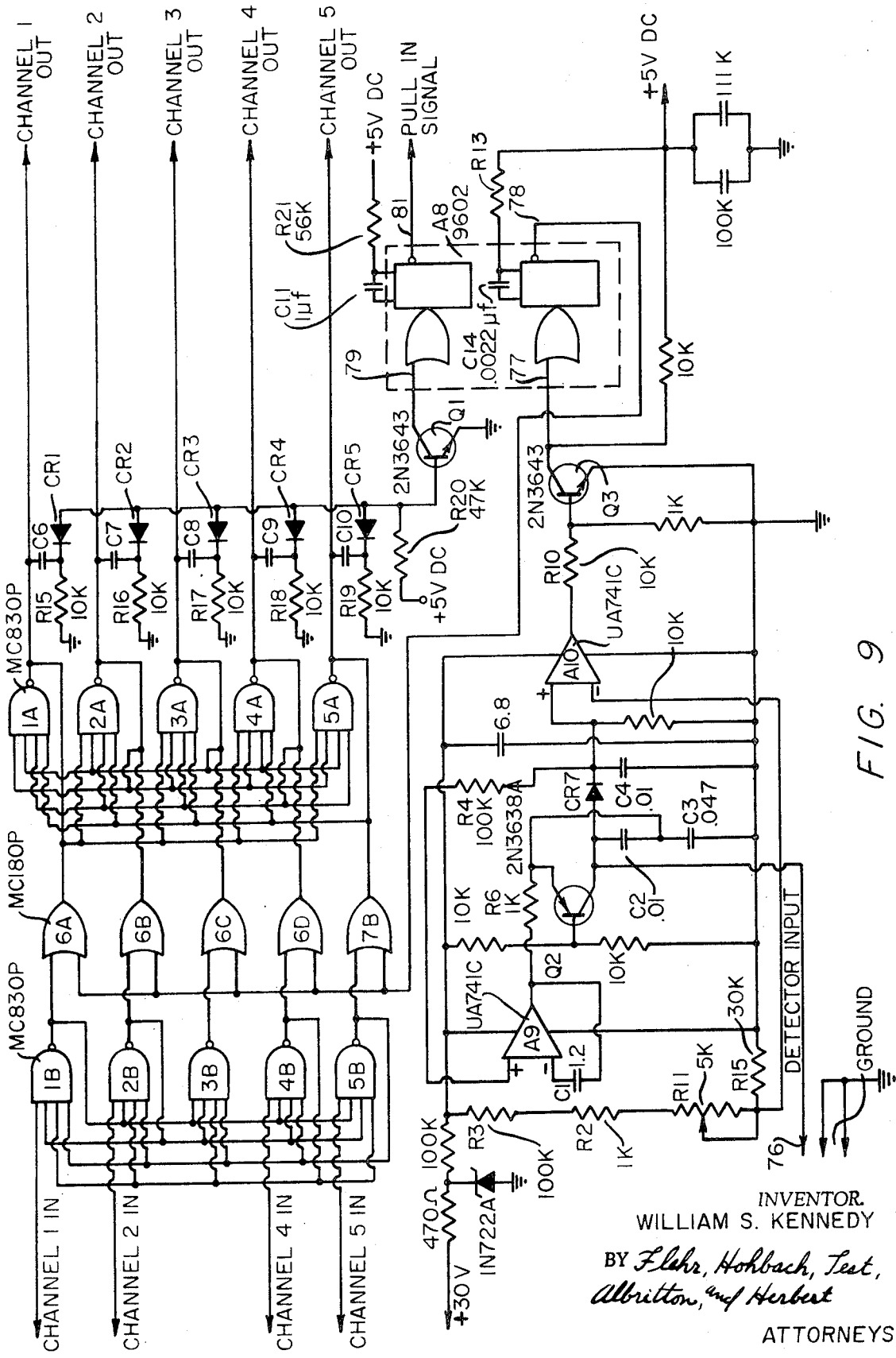
FIG. 9 is a circuit diagram of the logic circuit for assuring that the cam follower engages the cam grooves at the proper location.

Referring now to FIG. 9, a suitable logic circuit for controlling the energization of the solenoids is shown. The signal from associated apparatus such as a weight classifier, pattern generating electronics or the like is applied to the control circuits at the inputs 1, 2, 4 and 5.

The signal voltage on the selected channel is high; all others are low. In addition to these signals, the electronics receives a signal from the magnetic proximity sensing head 69 which detects the presence of a carrier guide pin. The sensing head 69 is located along the carrier return path at a position where a pin will be adjacent to the sensor just as a carrier leaves the influence of the cam follower. Thus, it is a safe time to deenergize a solenoid and energize another. The purpose of the electronics is to combine the four command signals and the carrier detector signal in a manner that causes the correct channel selector solenoid to be energized at the earliest opportunity, and to positively prevent two solenoids from ever being energized simultaneously.

The four command signals are connected to the inputs of a five state gate consisting of NAND gates 1B through 5B. These five gates are cross-connected so that the output of the selected channel gate will be low while all others will be high. If all four inputs are low, the output of channel 3 gate will be high. Hence, channel 3 is a fifth channel created when none of the four inputs are selected. The five outputs of the five state gate are connected to the inputs of five OR gates 6A, 6B, 6C, 6D and 7B. The other input to each of these OR gates is derived from the carrier detector circuitry.

Figure 6:
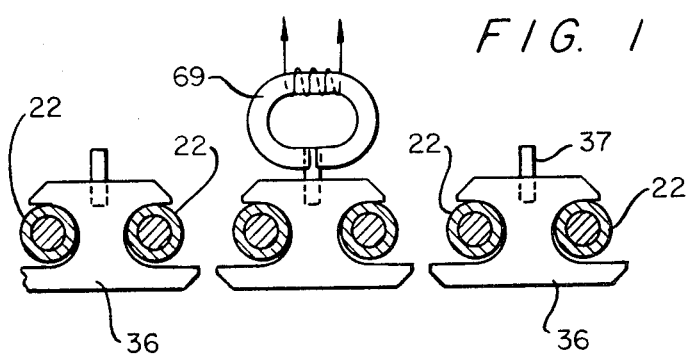
FIG. 6 shows an electromagnetic means for providing carrier location signals.

As previously described, the carrier sensor consists of a coil of wire wound on a small ferrite "C" core, FIG. 6. The sensor is connected to the carrier logic board between terminal 76 and ground. The inductance of the sensor coil and the capacitances C2 and C3 form a tuned circuit. This tuned circuit is connected to transistor Q2 and associated resistors in a manner to form a Colpitts oscillator. The a.c. voltage across the carrier detector sensor resulting from oscillation is rectified by CR7 and filtered by C4. The d.c. voltage across C4 is connected to the inverting input of an operational amplifier A9 via R4. The non-inverting input of this amplifier is connected to a fixed d.c. voltage derived from the voltage divider R3, R2, R11 and R15. The output of the operational amplifier is connected to the emitter of Q2 via R6. The action of the loop thus formed is to maintain the amplitude of oscillation constant by maintaining the average voltage across C4 at a level equal to the voltage at the non-inverting input of A9 supplied from the voltage divider. CPACITOR C1 connected between the inverting input of A9 and its output causes the response of this automatic gain control loop to be very slow. It is thus able to maintain the average amplitude of oscillation constant but is unable to correct for abrupt changes.

When a carrier guide pin moves adjacent to the carrier sensor, the Q of its inductance decreases and the amplitude of oscillations across the proximity sensor momentarily decreases. This causes a momentary drop in the d.c. voltage across C4. The voltage on C4 is connected to the non-inverting input of operational amplifier A10. The non-inverting input of A10 is connected to another point along the voltage divider R3, R2, R11 and R15. Normally the voltage at the non-inverting input of A10 is more positive than the voltage at the inverting input, hence its output is normally plus. When a carrier guide pin is adjacent the sensor 69, the voltage at the non-inverting input becomes less positive than the voltage at the inverting input, the output of A10 goes negative toward ground potential. The output of A10 is connected via R10 to the base of Q3. Q3 is normally turned on by the positive voltage at the output of A10. When a carrier guide pin is detected, the output of A10 drops and Q3 turns off. At this time, the collector of Q3 goes positive supplying a trigger pulse to input 77 of A8, a dual one-shot multivibrator. The $\overline{Q}$ output 78 of A8 is normally high and goes low during the timed interval. The timed interval is set to approximately 10 microseconds by the choice of values of C11 and R13.

The 10 microsecond negative going pulse from input 78 of A8 is connected to the remaining input of each of the five OR gates previously described. During the 10 microsecond timed interval, the output of the selected channel OR gate will go negative. The outputs of the five OR gates are connected to a five state latch consisting of NAND gates 1A through 5A.

Figure 10:
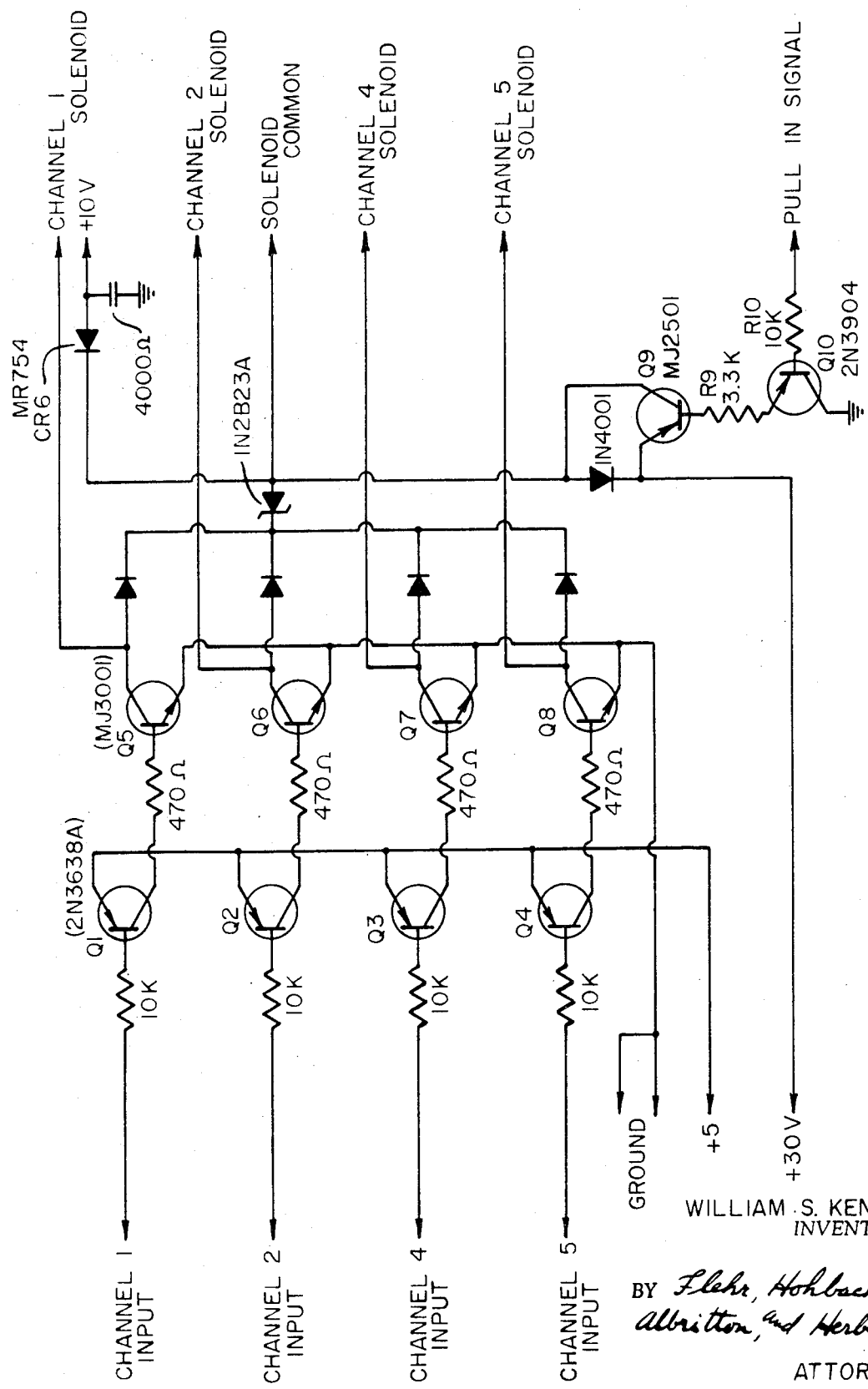
FIG. 10 shows the drive circuits for the cam follower solenoids.

The five NAND gates comprising the five state latch are interconnected in such a manner that the output of one and only one of the gates can be in its low state after the drive signal from the OR gates is terminated. The outputs of the OR gates are connected in a manner to force the output of one of the NAND gates to go low during the 10 microsecond timed interval. At the end of this interval, the action of the five state latch will continued to hold the output of that NAND gate low. The output of four of the five NAND gates are connected via a driver transistor and power darlington, FIG. 10, to the four channel selector solenoids. The output of NAND gate 3A does not energize a solenoid. Channel 3 is the dead channel which requires no solenoid to be energized for its selection. When any channel other than 3 is selected, its power darlington connects one side of the selected solenoid to ground. The other side of all solenoids is connected to a +10 volts supply via CR6 and also to a +30 volts supply via another power darlington Q9. Whenever the condition of the five state latch changes, the output of one of the NAND gates goes positive while another goes negative. Each of the five NAND gate outputs is connected to a differentiating circuit. For channels 1 through 5, the components constituting the five differentiators are C6 and R15, C7 and R16, C8 and R17, C9 and R18, and C10 and R19. When a change of state occurs at the output of the five state latch, a negative pulse will appear across one of the five resistors just mentioned. Diodes CR1 through CR5 are wired in an OR circuit and will pass the negative pulse from any of the five channels to the base of Q1.

Q1 is normally turned on because its base is connected to the +5 volt supply via R20. When a negative pulse is supplied to its base from the wired diode OR gate, Q1 momentarily turns off and its collector goes positive supplying a positive start pulse to terminal 79 of A8, the dual one-shot multivibrator. The Q output of A8 now goes positive for an interval determined by the values of C11 and R21. This interval is chosen to be approximately 20 milliseconds. The positive pulse from terminal 81 of A8 is connected via R10 (FIG. 10) to the base of Q10, causing Q10 to turn on during the 20 millisecond interval. The collector of Q10 is connected to the base of power darlington Q9 via R9 which causes the power darlington to turn on during the timed interval. This causes the supply side of the four solenoids to be connected to the 30 volt supply via Q9; thus during the 20 millisecond timed interval, the selected solenoid will be connected between ground and +30 volts. At the end of the 20 millisecond timed interval, the selected solenoid will be connected between ground and +10 volts. The purpose of this 20 millisecond high power solenoid drive is to ensure rapid pull-in. The low power continuous drive is adequate to hold in the selected solenoid and prevents excessive power dissipation in the solenoid coils. The solenoid remains energized until a new command is received at the input.

I claim:

1. Channelizer apparatus including a driven endless conveyor having an input and output end, a plurality of product carriers mounted on said conveyor to move with said conveyor and laterally from side to side of said conveyor, a guide projection mounted on each of said carriers, at least one delivery guide mounted under said conveyor between the input and output ends to engage the guide projection to move the carriers laterally as the conveyor moves the carriers between the input and output ends whereby the carriers follow a predetermined path, a return guide means mounted between the output and input end to engage the guide projections of the carriers and move them as they move from the output end back to the input end and to deliver all carriers at a predetermined location adjacent the input end, at least one curved cam surface adapted to move with said carriers, at least one cam surface engaging means adjacent said input end disposed to selectively engage said cam surface, the forward end of said cam surface being disposed to cooperate with the cam surface engaging means when the carrier is at said predetermined location whereby when the cam surface engaging means is selectively moved to engage with the cam surface the carriers are moved laterally from said predetermined location to a selected position where the guide projection engages the delivery guide to guide the carriers in said predetermined path.

2. A channerlizer apparatus as in claim 1 including a plurality of delivery guides whereby the carriers can follow one of a plurality of predetermined paths, a plurality of curved cam surfaces adapted to move with each of said carriers, and a plurality of cam surface engaging means one for each cam surface whereby selective engagement of said cam surface engaging means with the cam surfaces moves the carriers laterally to engage a selected delivery guide.

3. A channelizer apparatus as in claim 2 wherein said cam surfaces are portions of grooves formed in one face of said carriers.

4. A channelizer apparatus as in claim 1 wherein said means for moving said cam surface engaging means into cooperative relationship with said cam surfaces comprises a solenoid.

5. A channerlizer apparatus as in claim 2 wherein said means for selectively moving said cam surface engaging means comprises a plurality of solenoids.

6. A channelizer apparatus as in claim 2 wherein said cam surface engaging means comprises a pin and said means for selectively moving the pin comprises a solenoid which projects the pin into the path of said carriers to engage the selected cam surface.

7. A channelizer apparatus as in claim 2 including means for inhibiting movement of the cam surface engaging means until the cooperating carrier is at a predetermined position.

8. A channelizer apparatus as in claim 6 including electrical circuit means for inhibiting energization of more than one solenoid at one time.

9. A channelizer apparatus as in claim 8 including electrical circuit means preventing energization of a different solenoid until the cooperating carrier is at a predetermined position.

* * * * *